United States Patent [19]
Watson

[11] 3,750,778
[45] Aug. 7, 1973

[54] TRACTION DEVICES

[76] Inventor: Thomas Arthur Watts Knott Watson, 2720 Guyer, Apt. 24, Montreal 2me, Quebec, Canada

[22] Filed: Jan. 18, 1971

[21] Appl. No.: 107,171

Related U.S. Application Data

[63] Continuation-in-part of Ser. No. 26,037, April 6, 1970, abandoned.

[52] U.S. Cl. .................................. 180/9.36, 115/1
[51] Int. Cl. ........................................... B62d 55/02
[58] Field of Search ..................... 301/5, 41, 43, 47, 301/36, 39 T; 305/34, 35 EB; 280/DIG. 7; 115/1, 19; 180/21, 25

[56] References Cited
UNITED STATES PATENTS

| | | | |
|---|---|---|---|
| 2,751,959 | 6/1956 | Blomquist ....................... | 301/5 R X |
| 2,998,996 | 9/1961 | Aghnides ........................ | 301/5 R X |
| 1,225,181 | 5/1917 | Schleicher ...................... | 152/376 X |
| 2,330,623 | 9/1943 | Rantasa ............................ | 180/9.28 |
| 2,404,490 | 7/1946 | Hait .................................. | 115/1 R |
| 3,435,907 | 4/1969 | Imhoff .............................. | 180/9.26 |
| 3,242,896 | 3/1966 | Kauffmann ....................... | 115/1 R |
| 2,330,958 | 10/1943 | Danforth .......................... | 115/1 R |

*Primary Examiner*—Richard J. Johnson

[57] ABSTRACT

A vehicular traction system may comprise high pressure large outer diameter tires rotatably mounted about a horizontal axis and substantially smaller outer diameter lower pressure tires, also rotatably mounted about a horizontal axis.

In the more generalized case, however, the lower pressure tire need not necessarily be smaller in outer diameter than the high pressure tire. It may be the same size or even larger in diameter. The basic requirement is for the high pressure tire's outer peripheral surface to extend lower than the lowest point of the low pressure tire. The high pressure tire will then always be in surface contact on all surfaces, whereas the low pressure tire will only make surface contact on uneven ground or soft surfaces. A track may also be placed over the low pressure tires.

6 Claims, 22 Drawing Figures

3,750,778

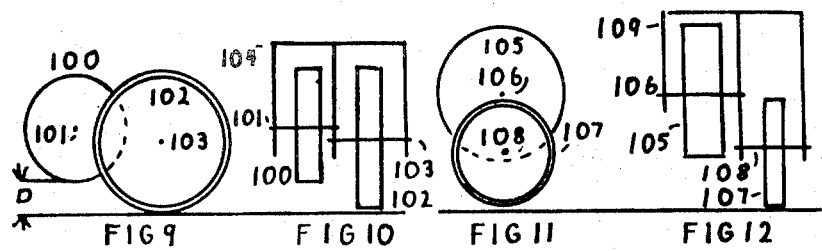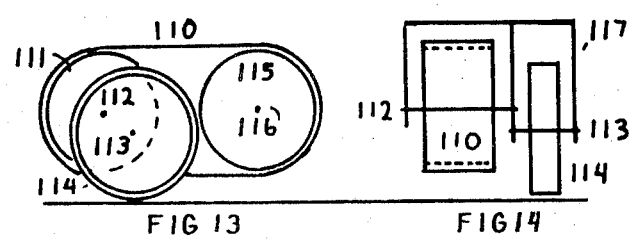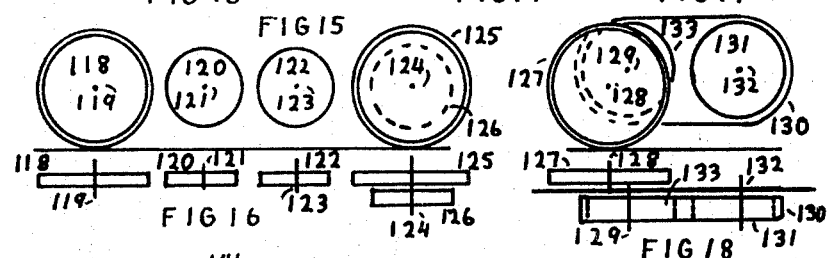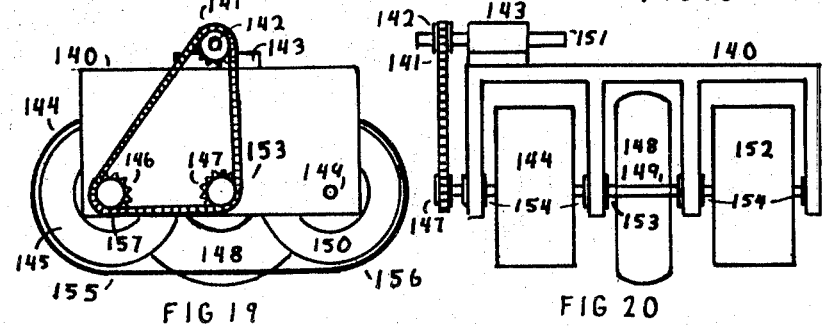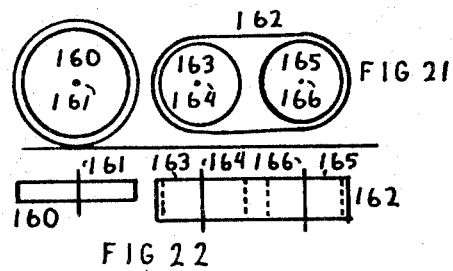

TRACTION DEVICES

This application is a continuation-in-part of application Ser. No. 26,037, filed Apr. 6th, 1970 and now abandoned.

This invention relates to special forms of traction devices capable of operating over a variety of surfaces such as snow, water, sand, swamps, highways, etc. without some form of modification or adaptation being required.

All terrain vehicles normally function well on rough terrain, but their performance is usually limited on highways. This is especially true of track type vehicles. This invention describes traction means suitable for use with track or wheel type all terrain vehicles. The main objective is to provide a combination of pneumatic tires rotatably mounted about horizontal axes suitable for travel on soft surfaces as well as highways sand, swamp, snow, marsh, mud and hard rugged rocky terrain. A further objective is to combine a track with the above tire arrangement to improve its floatation and traction characteristics, as well as having the capability of functioning adequately on a highway.

The invention is particularly directed toward a wheel comprising a tubular frame(s), rotatable about an axis. Annular means of at least two basic diameters are mounted on said frame(s). The annular means consists in the largest diameter case of a relatively higher pressure tire(s) of generally heavy construction and a smaller diameter lower pressure tire of lighter construction.

On hard surfaces the larger diameter tire takes the load while the smaller diameter tires do not make surface contact. The smaller diameter lower pressure tire(s) will deform if it strikes a hard object such as a rock. On soft surfaces the larger diameter tire(s) sinks and the lower pressure smaller diameter tire(s) become operative, sharing the load with the lager diameter tire(s). Treads on the larger diameter tire may be optimized for hard surfaces while those on the smaller diameter tire should be designed for soft surfaces. On soft surfaces the larger diameter tire will normally slip. However, means can be provided to run all tires at the same peripheral velocity.

Paddles may be placed on the sides of the wheel. They will provide a more efficient means of water propulsion than large treads placed on the running surface of the wheel. In order to take the best advantage of paddle propulsion, they must not trap water. If water is trapped, it will reduce the effective area of the paddles. For this reason the paddles are located on the sides of the wheel, where water may flow freely over their surfaces. They are not extended to the wheel's axis. This prevents unnecessary drag and assist the flow of water.

Side paddles, however, increase the width of the wheel and do not add to its lateral stability or improve its floatation characteristics. They are also subject to damage due to their exposure and could be somewhat dangerous. To overcome this problem, the paddles may be located in the running surface of the wheel between sections of its annular means. A practical symmetrical arrangement consists of a relatively large diameter high pressure tire and two outer lightweight lower pressure tires of smaller diameter at the ends of the wheel. The paddles are mounted in a radial fashion between the tires. They do not extend beyond the outer periphery of their adjacent tires. To prevent water entrapment, the paddles should have a water passage placed near the wheel's axis to allow a free flow of water.

The paddles may be angled away from the direction of rotation. This is effective on water since it reduces the tendency of the wheel to force itself down when pushing a boat. The summation of moments of force acting on the boat to which the wheel is attached is such that the rear of the boat will go deeper into the water.

When the paddles are radially short, an inner drum can be used to act as a bearing surface. This is particularly effective on snow. The inner drum may also be made buoyant enhancing a vehicle's floatation charcteristics. Water entrapment between the paddles and drum will occur, reducing the effective area of the paddles. Water passages or ports may be placed near or on the paddles to assist the flow of water so as to increase the effectiveness of propulsion. These ports would normally be placed near the drum. Tis wide wheel arrangement provides more lateral stability than can be obtained by placing paddles on the sides of the wheel. This arrangement is particularly advantageous in snow.

An endless track can be placed over the smaller diameter lower pressure tire and another suitable low pressure tire. This track normally would not touch ground when on hard surfaces; however, on soft surfaces the larger diameter tire would sink causing the track to come into surface contact. The velocity of the track would be less than the peripheral velocity of the large diameter tire, however, its tread would normally slip on soft surfaces. Drive means may be provided to run the track and the large diameter tire at the same peripheral velocity. This is also true of the large and small diameter tire arrangement. The track, if constructed from a pliable material like rubber, would deform when it struck a hard object such as a rock.

Paddles may be attached to the track to provide efficient water propulsion. The paddles when attached to a track mainly react horizontally rather than vertically and horizontally as is the case with a paddle wheel. The paddles may be attached to the wheel but they will be less efficient.

In the case where the low pressure tire is smaller in diameter than the high pressure tire it may be mounted for rotation about the same horizontal axis as the high pressure tire. Low pressure tires of the same or larger diameter than the high pressure tires may also be used, provided they are mounted on different horizontal axes and the high pressure tire's outer peripheral surface extends lower than that of the low pressure tires.

In some vehicles means may be provided to lower the low pressure tires or low pressure tires and tracks so that there lowest outer peripheral surface extends to or even below the lowest point of the high pressure tires outer peripheral surface. This could be advantageous on hard slippery surfaces especially when the low pressure tires or tracks are equipped with metal studs or cleats. There is considerable difficulty in finding storage space in a vehicle equipped with high pressure tires for highway operation and auxilary tracks or other wheels that may be lowered into position for off road travel. The system of providing low pressure tires which under some or all conditions does not extend as low as the high pressure tires, provides a convenient means of storage, since the effective clearance under the vehicle is a combination of the actual clearance and the extent to which the low pressure tires will deform. When rigid auxilary tracks or wheels are used the actual and effective clearance under the vehicle would be the same hence more storage space would have to be provided for these auxilary tracks or wheels.

Another object therefore is to provide an arrangement of traction devices which may be conveniently located or stored in a vehicle.

All tires are pneumatic and come in a variety of forms, some being tubeless and mounted on a rim, others requiring tubes and are also mounted on a rim, whereas in some cases the tire and wheel are all one piece, employing no rim. The term tire referred to herein is any pneumatic chamber rotatable about a horizontal axis which may take the form of a part of a wheel or an entire wheel. The low and high pressure tires could be combined to form a combiantion of tires in a single unit.

The above devices can be employed to provide traction for a variety of vehicles. They have the unique advantage of providing excellent performance at high speeds on paved roads. They also provide good traction on other hard and soft surfaces as well as water.

FIG. 9 is a schematic of a side view of a large diameter high pressure tire and a smaller diameter for low pressure tire.

FIG. 10 is a front view of the arrangement shown in FIG. 9.

FIG. 11 is a schematic of a side view of a small diameter high pressure tire and a larger diameter low pressure tire.

FIG. 12 is a front view of the arrangement shown in FIG. 11.

FIG. 13 is a schematic of a side view of equal diameter high pressure tires and two low pressure tires with a track arrangement.

FIG. 14 is a front view of the arrangement shown in FIG. 13.

FIG. 15 is a schematic of a side view of two high pressure tires and three smaller diameter lower pressure tires.

FIG. 16 is a plan view of the arrangement shown in FIG. 15.

FIG. 17 is a schematic of a side view of a large diameter high pressure tire and two smaller diameter low pressure tires about which is mounted a track.

FIG. 18 is a plan view of the arrangement shown in FIG. 17.

FIG. 19 is a side view of four low pressure tires, two tracks and one larger diameter high pressure tire.

FIG. 20 is a front view of the arrangement shown in FIG. 19.

FIG. 21 is a schematic of a side view of a large diameter high pressure tire and two low pressure tires about which is mounted a track.

FIG. 22 is a plan view of the arrangement shown in FIG. 21.

Figure 1:
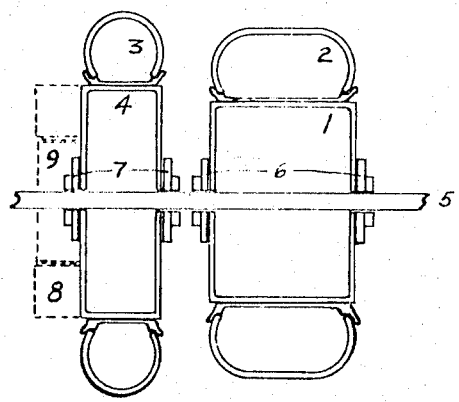
FIG. 1 is a cross sectional front elevation view of the basic invention showing different diameter tires.

FIG. 1 shows the invention in its basic form consisting of a wheel arrangement composed of a rim and drum 1, upon which is mounted a relatively small diameter low pressure tire 2. Tire 3 is of a relatively heavier construction, higher pressure and larger diameter than tire 2. Tire 2 is shown as being wider than tire 3, but this is not necessarily a system requirement. Tire 3 is mounted on rim and drum 4. The rims and drums 1 and 4 are rigidly mounted to axle 5 by flanges 6 and 7 respectively. Axel 5 may be driven by an engine or it may be mounted on bearings so as to act as a free wheeling device. Flanges 6 and 7 may also take the form of bearings allowing each wheel to revolve at different angular velocities.

Shown in broken lines are paddles 8 attached to the side of rim and drum 4, which serve to provide propulsion on water. Their location is such as to afford the maximum protection from damage and also to provide efficient water propulsion. They do not extend to the axle 5, otherwise they would create excessive drag. Rims and drums 1 and 4 may be made buoyant if desirable. A cylinder 9 shown in dotted lines may be fixed to the rim and drum 4. This will provide an extra bearing surface which gives additional flotation on soft terrain such as snow.

Figures 2, 3:
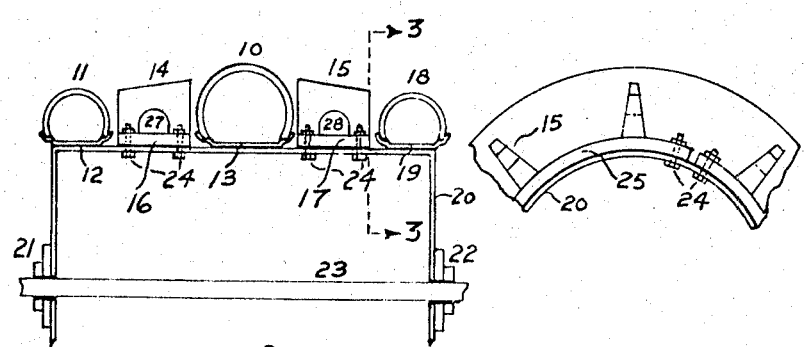
FIG. 2 is a partial cross sectional front elevation view of an embodiment of the invention employing ported paddles.
FIG. 3 is a partial side view along the lines 3—3 of the paddle arrangement shown in FIG. 2.

FIG. 2 shows a symmetrical arrangement which imparts lateral stability to a vehicle and is suitable for water as well as snow, swamp and hard surfaces. A relatively high pressure large diameter tire 10 is mounted on rim 13 which is fixed to drum 20. Relatively smaller diameter lower pressure tires 11 and 18 are mounted on rims 12 and 19 respectively which in turn is fixed to drum 20. Paddles 15 as shown in FIG. 3 are moulded as part of a rubber strip 25 which is bolted to drum 20 by means of bolts 24. The paddles would normally be made out of a pliable material, otherwise they may become damaged when they strike hard objects. The rubber strip 25 serves also to protect the metal drum 20. Paddles 14 are similarly moulded as part of strip 16 which is mounted to drum 20 by means of bolts 24. Water bypass ports or passages 27 and 28 are shown placed in paddles 14 and 15 respectively. Drum 20 is mounted on flanges 21 and 22 which are fixed to axel 23.

In this arrangement drum 20 is made buoyant and hence improves the vehicle's floatation on water. Ports 27 and 28 act as water bypasses to improve the effectiveness of the paddles. The surfade of strips 16 and 25 serve to provide an additional bearing area on soft surfaces such as snow. Tires 10, 11 and 18 are in surface contact when on soft surfaces, whereas only tire 10 is operative on hard surfaces.

Figures 4, 5:
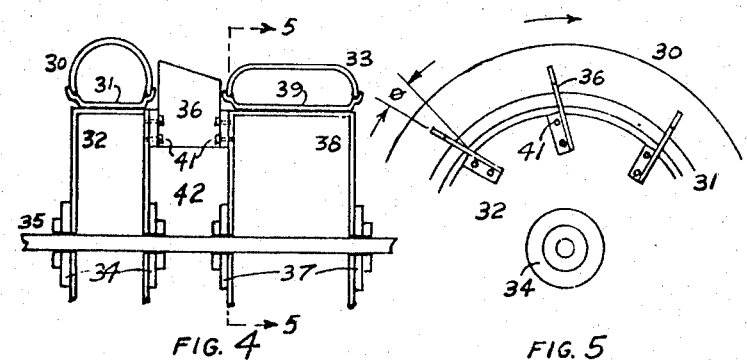
FIG. 4 is a partial cross sectional front elevation view showing different diameter tires between which is mounted a paddle arrangement.
FIG. 5 is a partial side view along the lines 5—5 of the paddle arrangement shown in FIG. 4.

FIGS. 4 and 5 show a somewhat different arrangement employing a deep paddle with a large gap 42 between the innermost edge of the paddle and the axis of rotation. Tire 30 is mounted on rim 31 which in turn is mounted on drum 32. Drum 32 is mounted on axle 35 by means of flanges 34. A wide tire 33 which is smaller in diameter than tire 30 and is inflated to a lower pressure is mounted on rim 39 which in turn is mounted on drum 38. Drum 38 is mounted on axle 35 by means of flanges 37. Paddles 36 are mounted to drum 32 and 38 by means of bolts 41.

This arrangement does not provide as large a surface area as that shown in FIGS. 2 and 3 due to the lack of a bearing surface in the paddle area. The paddles themselves do provide some bearing surfaces. The paddles with the large water passage provide a relatively better means of water propulsion for a given wheel size. The buoyancy of the wheel, however, is somewhat less than that shown in FIG. 2.

The paddles 36 are shown angled away from the direction of rotation by an angle $\theta$. This angling provides a degree of lift to the wheel and reduces rear splash when on water. When pushing a boat, a paddle wheel will sink into the water and when pulling, it will rise. The upward and downward forces acting on the paddle wheel when it is rotating can be assumed to be approximately equal. The downward forces occur at the back of the paddle wheel when pushing a boat. The moment arm between their downward force and the center of flotation of the boat is longer than the moment arm between this center and the upward forces acting at the front of the paddle wheel. The result is a net downward reaction, which this lift tends to counteract.

Figure 6:
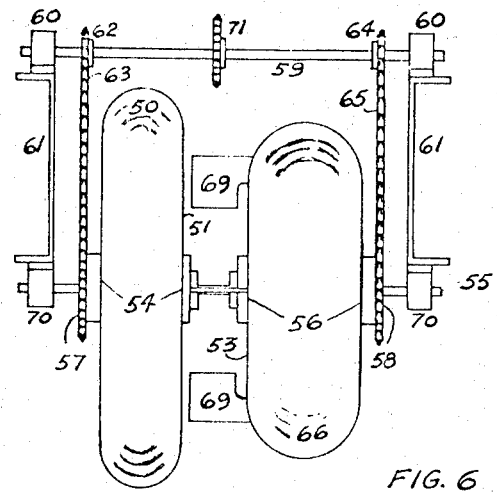
FIG. 6 is a front elevation view of an arrangement for driving two different diameter tires at the same peripheral velocity.
Figure 7:
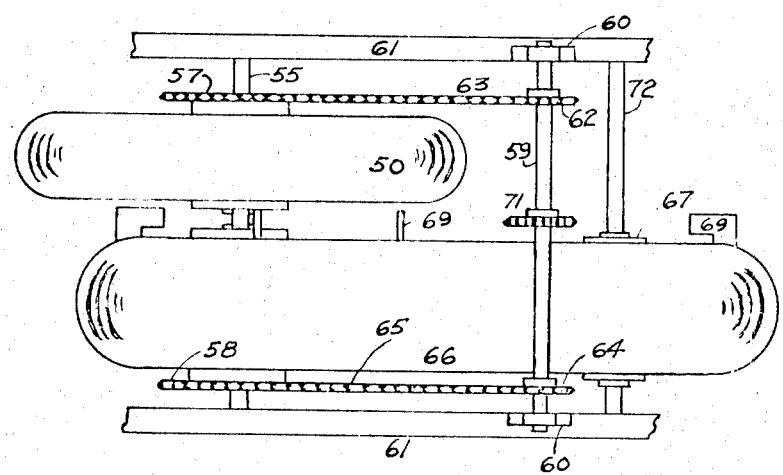
FIG. 7 is a plan view of the arrangement shown in FIG. 6.
Figure 8:
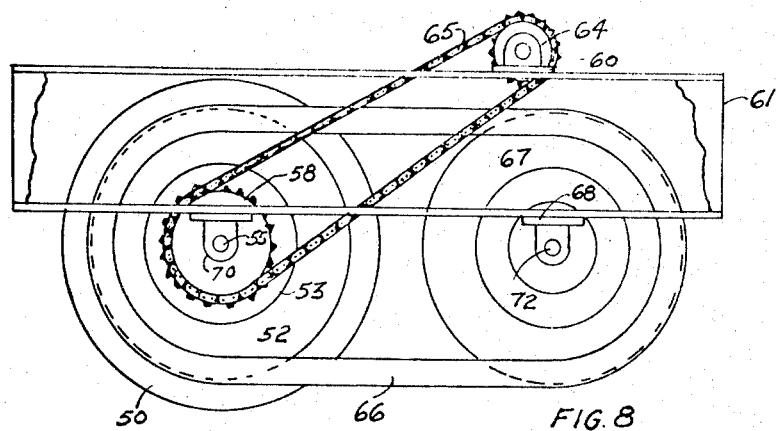
FIG. 8 is a side view of the arrangement shown in FIG. 6.

FIGS. 6, 7 and 8 show an arrangement for driving a relatively large diameter high pressure tire 50 at about the same peripheral velocity as a relatively smaller diameter lower pressure tire 52. The basic construction of the tire arrangement is as shown in FIG. 1. Tire 50 is mounted on a rim and drum 51 which in turn is mounted to flange bearings 54 which rotate about axle 55. A sprocket 57 is fixed to flange No. 54. Tire 52 is similarly mounted to rim and drum 53. Flange bearings 56 are mounted to rim and drum 53 to which is also mounted sprocket 58. Bearings 56 rotate about axle 55 which is fixed in blocks 70 mounted on frame 61. An axle 59 is mounted in bearing 60 is driven by means of an external chain and sprocket system 71. Sprockets 62 and 64 are attached to axle 59 and drive chains 63 and 65 respectively which in turn drive sprockets 57 and 58.

A pliable track 66 is placed over tire 52 and wheel 67 and its associated low pressure tire. Wheel 67 is mounted on axle 72. Axle 72 is mounted on bearing 68 fixed to frame 61. Paddles 69 are attached to track 66.

The addition of the track makes a vehicle more adaptable to soft surfaces such as snow and swamp. Such a vehicle would exhibit good performance at high speeds on paved roads. The low and high pressure tires may be driven at the same angular velocity with a track placed over the smaller diameter lower pressure tires.

FIGS. 1 to 8 do not show all the combinations or variations that are possible. A wheel could be composed of tires with three or more different diameters and/or pressures, rather than just two. The tires and rims could be spread out on a common axle leaving a gap between the tires. They could have bearings and supporting means placed between them. The paddles could be placed separate to the tires. The large diameter tire and rim could be placed on a different axle out of line with the axle to which the low pressure tire and rim is mounted. The large diameter tire and rim could be driven whereas the smaller diameter tire could be left to run freely on its own separate bearing. The tire and track arrangement shown in FIGS. 6, 7 and 8 could have another low pressure tire associated with the system. A symmetrical arrangement could be made by employing a large central diameter tire on both sides of which is placed a low pressure tire and track. A high pressure large diameter tire and rim could even be placed behind one or more low pressure smaller diameter tires and rims.

All the possibilities have not been mentioned. For the purpose of this document the wheel arrangements claimed refer to any vehicle comprising relatively large diameter high pressure tires and relatively smaller diameter lower pressure tires. The said large diameter tires are always in surface contact on a flat hard surface, whereas there is a clearance under said smaller diameter tires. It also refers to any vehicle employing paddles, bearing surfaces and tracks in combination with the above system of tires.

FIGS. 9 and 10 show a high pressure large diameter tire 102 rotatable about a horizontal axis 103 and a lower pressure smaller diameter tire 100 rotatable about a horizontal axis 101 all mounted to frame 104. The low pressure tire 100 is smaller than tire 102 and the lowest point of its outer peripheral surface is the distance D higher than that of the high pressure tire 102.

FIGS. 11 and 12 show a relatively smaller diameter higher pressure tire 107 mounted on axis 108 and a larger diameter lower pressure tire 105 mounted on axis 106, all mounted to frame 109. Again the low pressure tire's lowest point is higher than the lowest point of the high pressure tire and does not come into ground contact on hard flat surfaces. It should be noted that the axis of rotation of the high pressure tire is always lower than the low pressure tires axis when they are of equal size or the high pressure tire's diameter is smaller than the low pressure tire's diameter.

FIGS. 13 and 14 show a combination of a high pressure tire 114 rotatable about an axis 113 and low pressure tires 111 and 115 rotatable about axes 112 and 116 respectively. All tires have the same diameter and are mounted on frame 117. A track 110 encompasses tires 111 and 115. All the tires may be driven with the same angular velocity.

FIGS. 15 and 16 show relatively larger diameter high pressure tires 118 and 125 mounted on axes 119 and 124 respectively. Smaller diameter low pressure tires 120, 122 and 126 are mounted on axes 121, 123, and 124 respectively. The low pressure ties again do not make surface contact on flat hard surfaces.

FIGS. 17 and 18 show a relatively large diameter high pressure tire 127 mounted on axis 128 and smaller diameter lower pressure tires 133 and 131 mounted on axes 129 and 132 respectively. A track 130 encompasses tires 131 and 133.

FIGS. 19 and 20 show a frame 140 to which is mounted bearings 154. Low pressure tires 150 and 156 (not shown) are mounted on axle 149 which runs in bearings 154. Low pressure tires 145 and 155 (not shown) are mounted on axle 157 which runs on bearings 154 mounted to frame 140. A sprocket 146 is fixed to shaft 157 and is driven by chain 141 driven by sprocket 142 on shaft 151, which rotates in bearing 143 mounted on frame 140. A pliable track 144 encompasses tires 145 and 150 and a pliable track 152 is placed over tires 155 and 156. A high pressure tire 148 is suitably mounted on axle 153 which rotates on bearings 154 mounted to frame 140. A sprocket 147 is fixed to axle 153 and is driven by chain 141. The ratio of sprockets 146 and 147 are selected to drive the tire 148 and the tracks 144 and 152 at the same peripheral velocity.

FIGS. 21 and 22 show a large diameter high pressure tire 160 mounted on axis 161 and two low pressure tires 163 and 165 mounted on axes 164 and 166 respectively. A track 162 encompasses low pressure tires 163 and 165. The track 162 as shoqn has considerably more surface than tire 160 and will therefore greatly enhance a vehicle's flotation characteristics on soft surfaces.

The invention is not to be construed as limited to the particular forms disclosed herein, since these are to be regarded as illustrative rather than restrictive.

I claim:

1. In a vehicle traction means comprising a track, at least one tire of a first group and at least two tires of a second group, the tire(s) of the first group inflated to a substantially higher pressure than the tires of the second group, in which the tire(s) of the first group are rotatably mounted to the vehicle about lateral horizontal axes, the tires of the second group are mounted longitudinally inline about lateral horizontal axes, the track is mounted to encompass the tires of the second group and is arranged to provide a clearance between the lowest point of the outer peripheral surface of the track and a horizontal plane in contact with the lowest point of the outer peripheral surface of the first group.

2. In a vehicle traction means, a wheel arrangement suitable for travelling on highways or other hard surfaces and on soft terrain, comprising a track, a plurality of tires mounted in close proximity to each other for rotation about horizontal parallel axes, at least a first of said tires being inflated to a substantially higher pressure than at least a second and a third of said tires, the second tire mounted inline and ahead of the third tire, the track mounted so as to encompass the second and the third tires, so that said first tire only will contact a highway or other hard flat surface but the vehicle will be supported by all said tires and the track when travelling on soft terrain.

3. A traction means as claimed in claim 2 comprising a drive means for driving the first tire and the track at substantially the same peripheral velocity, drivably connected to the high pressure tire and the track.

4. In a vehicle traction means, a wheel arrangement suitable for travelling on highways or other hard surfaces and on soft terrain, comprising a track, a plurality of tires mounted in close proximity to each other for rotation about horizontal parallel axes, at least a first of said tires having a greater outer diameter than and being inflated to a substantially higher pressure than at least a second and a third of said tires, the second tire mounted inline and ahead of the third tire, the track mounted so as to encompass the second and the third tires, so that said first tire only will contact a highway or other hard flat surface but the vehicle will be supported by all said tires and track when travelling on soft terrain.

5. A traction means as claimed in claim 4 comprising a drive means for driving the first tire and the track at substantially the same peripheral velocity, drivably connected to the high pressure tire and the track.

6. In a vehicle traction means, a wheel arrangement suitable for travelling on highways or other hard surfaces and on soft terrain, comprising a track, a plurality of tires mounted in close proximity to each other about separate horizontal parallel axes, at least a first of said tires being inflated to a substantially higher pressure than at least a second and a third of said tires, the second tire mounted in line and ahead of the third tire, the track mounted so as to encompass the second and third tires, so that said first tire only will contact a highway or other hard flat surface, but the vehicle will be supported by all said tires and the track when travelling on soft terrain.

* * * * *